Jan. 21, 1969 P. C. BODETT 3,422,633

DELAYED RESTARTING CIRCUIT FOR COMPRESSOR MOTOR

Filed June 13, 1966

INVENTOR
PETER C. BODETT
BY
Barnes, Kisselle, Raisch, & Choate
ATTORNEYS

United States Patent Office 3,422,633
Patented Jan. 21, 1969

3,422,633
DELAYED RESTARTING CIRCUIT FOR
COMPRESSOR MOTOR
Peter C. Bodett, Sturgis, Mich., assignor to Motor Wheel
Corporation, Lansing, Mich., a corporation of Ohio
Filed June 13, 1966, Ser. No. 557,019
U.S. Cl. 62—158                                    7 Claims
Int. Cl. G05d 23/32; F25b 1/00

ABSTRACT OF THE DISCLOSURE

A thermal relay circuit providing delayed restarting of a compressor motor in a refrigeration system each time the power to the motor is interrupted by either a line fault, the thermostat or a shut-off switch. The thermal relay is connected in the delayed restarting circuit so that as soon as the relay has performed its delayed restarting function it is deenergized and reset for the next power interruption. The thermal relay does not modify the delayed restarting of an overload protection circuit also provided for the motor.

---

This invention relates to delayed restarting of a compressor motor in an air conditioner of the type that is used in mobile homes, trailers, campers, boats or the like where operation from an auxiliary power supply such as a motor-generator is contemplated.

In the operation of air conditioners, stopping and restarting of the compressor motor occurs for a number of different reasons. The comperssor motor may be controlled thermostatically so that the motor is turned on and off depending on the temperature of the environment being cooled. Faults in the power supply can also cause stopping and restarting. Overload protection circuits are also commonly used to protect the motor against overload, particularly to protect the motor windings against overheating and permanent damage. Overload protection circuits may have a built-in time delay which assures that the motor is not restarted for a time sufficient to permit the windings and compressor housing to cool. Regardless of the cause that stops the motor, unless the pressure of the refrigerant in the system has had sufficient time to equalize, as through a capillary tube in the system, a substantial load is presented to the compressor motor on restarting. The aforementioned overload protection circuits have a sufficient built-in time delay to assure pressure equalization. However, additional delayed restarting controls would be required to assure pressure equalization before restarting when the motor is stopped by the thermostat or by a fault in the power supply. It is necsary to provide only a short time delay for restarting after the motor is stopped by the thermostat or a power supply fault by comparison with the relatively long restarting delay provided by the overload protection circuits.

Problems in restarting compressor motors are compounded with air conditioners that are used in trailers or the like and operated by auxiliary power supplies, such as a motor-generator, since the electrical load on the motor-generator must also be taken into consideration. High starting surge currents are required by the compressor motor if the refrigerant pessure is not equalized before restarting. By assuring pressure equalization under all restarting conditions, the starting surge currents can be reduced to protect the auxiliary power supply against overload. Additionally, air conditioners employ motor driven fans for circulating air over the evaporator and the condenser. Possible overloading of the auxiliary power supply can also be minimized by preventing simultaneous restarting of the fan motor and the compressor motor.

It is highly desirable to accomplish effective restarting at the lowest possible cost.

The objects of the present invention are to provide an improved delayed restarting circuit for the compressor motor of an air conditioner that is reliable, simple and low cost; that can be easily and economically incorporated into the motor control circuits of hermetically sealed motor-compressor units that are commercially available; that operates independently of the overload protection circuit and thus can satisfy delayed restarting requirements after a power supply fault or with normal thermostat operation more efficiently and effectively than where it must also delay restarting after an overload; and that reduces possible overloading of an auxiliary power supply by assuring that the compressor motor and the fan motor are not turned on simultaneously.

Other objects, features and advantages of the present invention will become apparent in conjunction with the following description, the appended claims and the accompanying drawings in which:

Figure 1:
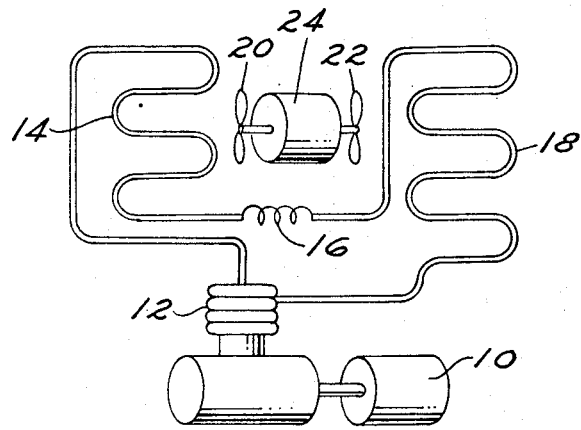
FIG. 1 is a schematic illustration of an air conditioning system with which the delayed starting circuit of the present invention can be used.

The preferred application of the delayed restarting control of the present invention is with an air conditioner illustrated schematically in FIG. 1. The air conditioner includes the usual compressor motor 10, compressor 12, condenser 14, capillary tube 16 and evaporator 18 connected together in a conventional closed refrigerant system. The usual fans 20, 22 are driven by a fan motor 24 to circulate air over condenser 14 and evaporator 18. The air conditioner shown in FIG. 1 is for purposes of illustration only, it being understood that the details of the air conditioner are not a part of the present invention and that various modifications are contemplated. Motor 10 and compressor 12 are conventionally incorporated in a hermetically sealed unit. Other refrigerant expansion control means such as an expansion valve can be used in place for the capillary tube 16.

Figure 2:
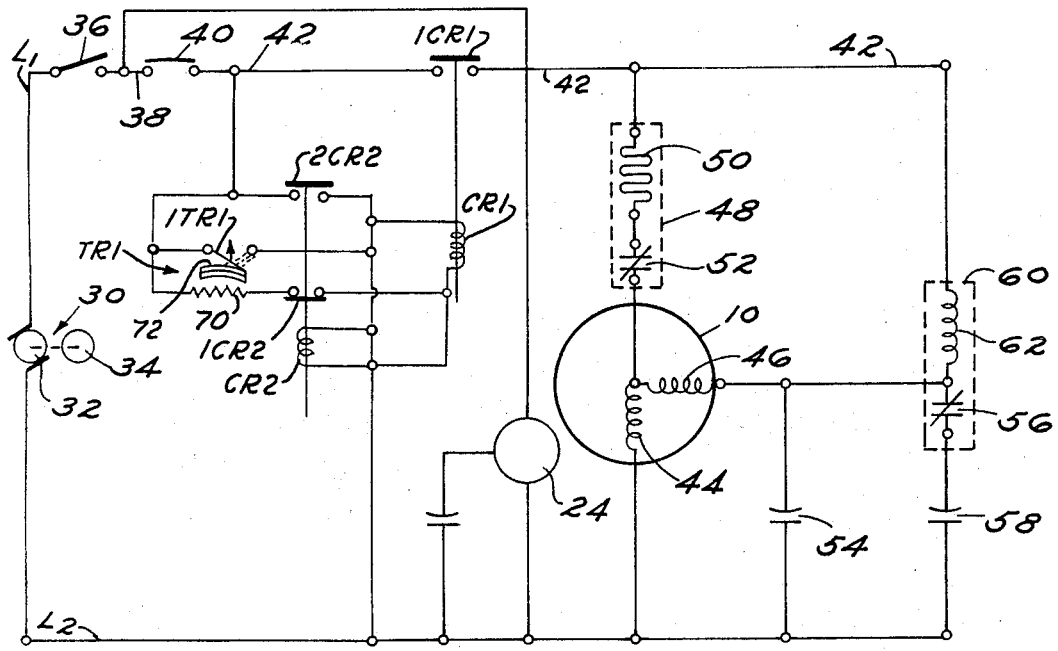
FIG. 2 is a circuit diagram of the controls for the compressor motor and the fan motor including the delayed restarting control of the present invention.

The circuit of FIG. 2 for controlling motor 10 includes an auxiliary alternating current source 30 illustrated as a generator 32 driven by a motor 34. In the preferred application, the control circuit of the present invention is used with air conditioners that are powered by auxiliary power supplies other than steady sources of power, as from utility lines. The output of generator 32 is connected to a pair of mains L1, L2. The main L1 is connected through a manually operated on-off switch 36, a line 38 and thermal actuated switch contacts 40 to a line 42 which includes normally open relay contacts 1CR1. Contacts 40 are part of the thermostat of the air conditioner. The compressor motor 10 is a split-phase induction motor (capacitor-start, capacitor run) having a run winding 44 and a start winding 46. The run winding 44 is connected across line 42 and main L2 through an overload protection circuit 48 consisting of a resistance heater 50 connected in series with normally closed bimetal switch contacts 52. Contacts 52 are operated by heater 50 in response to excessive current through windings 44, 46. Preferably, contacts 52 also respond directly to the temperature of the compressor shell. The start winding 46 is connected across the run winding 44 through a run capacitor 54 to main L2. A start capacitor 58 is connected in parallel with the run capacitor 54 through normally closed relay contacts 56 of a motor starting circuit 60. Contacts 56 are operated by a voltage responsive relay coil 62 connected between the contacts 56 and line 42. The fan motor 24 is connected directly across line 38 and main L2 so as to be controlled only by switch 36.

The delayed restarting control of the present invention generally comprises a thermal relay TR1 having a resistance heater 70, a bimetal switch element 72 and normally open contacts 1TR1. The resistance heater 70 is connected across line 42 and main L2 through normally closed contacts 1CR2 of a relay CR2. The relay CR2 is in turn connected across line 42 and main L2 through the contacts 1TR1. Relay CR2 also has normally open contacts 2CR2 which also connect relay CR2 across line 42 and main L2 to seal the relay CR2. The relay CR1 is also connected across line 42 and main L2 in parallel with CR2 through either of the normally open contacts 1TR1 and 2CR2.

In operation of the air conditioner and the controls described hereinabove, switch 36 is closed to initiate operation of the control and turn on the fan motor 24. If the temperature of the environment being cooled is above the desired temperature set on the thermostat, contacts 40 close to connect line 42 to the source 30. When the contacts 40 close, heater 70 of the thermal relay TR1 is energized through the normally closed contacts 1CR2 to heat the bimetal switch element 72. As the element 72 heats, it warps to close contacts 1TR1 after a predetermined time delay to energize relays CR1 and CR2. When relay CR2 is energized, contacts 1CR2 open to disconnect heater 70 from line 42 and contacts 2CR2 close to seal relays CR1 and CR2. When contacts 1CR2 open and heater 70 is deenergized, the bimetal element 72 cools and opens contacts 1TR1. When relay CR1 is energized, contacts 1CR1 close to complete line 42 and energize the run winding 44 and the start winding 46 in a conventional manner. Contacts 56 of the starting circuit 60 are closed so that the start capacitor 58 is connected in circuit with winding 46. As the speed of the motor picks up, in response to a predetermined voltage the relay coil 62 opens contacts 56 to take the capacitor 58 out of the circuit in a conventional manner. As long as motor 10 is not overloaded, the contacts 52 in the overload protection circuit 48 remain closed. However, on overload the bimetal contacts 52 will open in response to excessive current through heater 50 or in response to excessive heat of the compressor shell. The bimetal switch contacts 52 have a long reset time to assure that the windings and the compressor have cooled to a low temperature where the compressor can be restarted affectively.

During normal operation, when the environment being cooled reaches the desired temperature and the thermostat opens contacts 40 to stop motor 10, relays CR1, CR2 are deenergized to open contacts 1CR1 and 2CR2 and close contacts 1CR2. With contacts 1CR2 closed, heater 70 is readied for the next restarting. When the contacts 40 reclose, the compressor motor 10 can restart only after the delayed restarting sequence introduced by the thermal relay TR1. Element 72 will warp after a predetermined time delay in response to heating by heater 70 to close contacts 1TR1 which in turn energize relays CR1, CR2 to close contacts 2CR2 and 1CR1 and open contact 1CR2. It will be apparent that whenever motor 10 is stopped due to a power supply fault, the motor cannot be restarted without cycling of the time delay control in the manner described above in conjunction with initial starting by switch 36 and restarting by contacts 40.

The restarting delay introduced by thermal relay TR1 need only be long enough to assure that refrigerant pressure in the system shown in FIG. 1 has equalized through capillary tube 16 sufficiently to present a low starting load for the motor 10. During normal operation when the compressor motor 10 stops, the refrigerant pressure equalizes through the capillary tube 16 in a relatively short time. The delayed restarting by relay TR1 operates completely independently of the overload protection circuit 48 and independently of the time delay in reclosing contacts 52 once the overload protection circuit 48 is tripped. Thus, the delay introduced by relay TR1 can be short relative to the delay provided by the overload protection circuit 48. Stated differently, the time relay introduced by relay TR1 modifies the operation of contacts 40 and switch 36 and also restarting after a line fault but it does not modify restarting operation of the overload protection circuit 48. Additionally, the delayed restarting circuit does not affect the operation of the fan motor 24. This arrangement assures that the source 30 will never be loaded by starting or restarting both motors 10, 24 simultaneously.

The invention described hereinabove provides an extremely simple delayed restarting circuit which can be incorporated economically into the motor controls for commercially available motor-compressor units for air conditioners. Since the thermal relay TR1 does not carry the motor current, the relay is a relatively inexpensive low current device. By way of further illustration, hermetically sealed units containing motor 10, compressor 12 and the overload protection circuit 48 are commercially available and the capacitor starting circuit and the delayed restarting circuit can be added economically by the air conditioner manufacturer. With 6,000 and 10,000 B.t.u. air conditioners for which the present invention was conceived, the pressure equalizes in about 90 seconds and the thermal relay provides a time delay of about 120 seconds. By comparison, the overload protection circuit delays restarting for a substantially longer period, say fifteen minutes to one hour depending on the ambient temperature.

Figure 3:
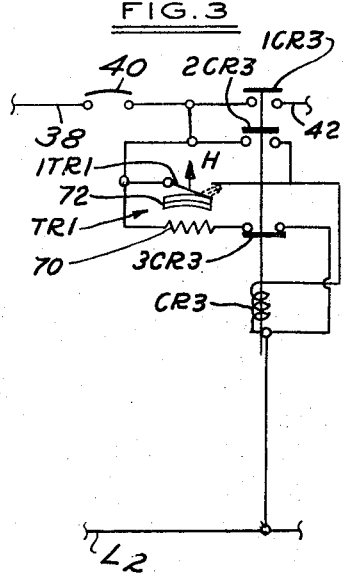
FIG. 3 illustrates a simple modification in the delayed restarting control that can be incorporated in the motor control circuit llustrated in FIG. 1.

FIG. 3 illustrates a simple modification to further reduce the cost of the control for certain applications where a single relay can be used more economically depending on the contact rating required for carrying the compressor motor current. The relays CR1, CR2 are replaced by a single relay CR3 having two normally open contacts 1CR3, 2CR3 and one normally closed contact 3CR3. Contact 1CR3 replaces contact 1CR1 (FIG. 2) to interrupt line 42; contact 2CR3 replaces contact 2CR2 (FIG. 2) to seal relay CR3; and contact 3CR3 replaces contact 1CR2 (FIG. 2) to connect and disconnect the heater 70 of the thermal relay TR1 (FIGS. 2 and 3). The time delay sequence by thermal relay TR1 upon starting or restarting with either switch 36 or contacts 40 or in response to a power supply fault is substantially identical to the operation disclosed hereinabove in conjunction with FIG. 2 as will be apparent.

It is to be understood that the air conditioner and the delayed restarting controls of the present invention have been described hereinabove for purposes of illustration and are not intended to indicate the limits of the present invention, the scope of which is defined by the following claims:

I claim:
1. In a combination a compressor, a condenser, an evaporator, and refrigerant expansion control means operatively connected into a closed refrigeration system, a compressor motor operative to drive said compressor, a fan for circulating air over at least the condenser or the evaporator, a fan motor operative to drive said fan, first circuit means for connecting said compressor motor to a source of electrical current to energize said compressor motor, overload control means in said first circuit means operative to interrupt current in said first circuit means in response to an overload of said compressor motor and turn said compressor motor off, thermal actuated control means in said first circuit means for selectively opening and closing a connection in the first circuit means to connect and disconnect said compressor motor to and from said source in response to temperature variations in the environment being cooled by the refrigeration system, time delay control means in said first circuit means operative in response to reclosing of said connection by said thermal actuated control means to maintain said first circuit means open for a predetermined time after reclosing of said connection and then automatically close said first circuit means so as to allow pressure to equalize in said system through said expansion control means before said compressor is energized through said first circuit means, said time delay control means being nonresponsive to interruption of said first circuit means by said overload control means so that said time delay control means modifies the control function of said thermal actuated control means independently of the control function of the overload control means, and wherein said time delay control means comprises a thermal relay having resistance heating means and first normally open contacts which close after said predetermined time in response to energization of said heater, and second relay means having energizing coil means and second contact means, said thermal relay contacts being operatively connected in circuit with said second relay coil means to actuate said second relay means, and said second contact means being operatively connected in said first circuit means and in said time delay control means to substantially simultaneously deenergize said resistance heater means and connect said motor to said source.

2. The combination set forth in claim 1 further comprising second circuit means for connecting said fan motor to said source and switch means operatively connected in said first circut means and in said second circuit means to connect the compressor motor to said source under the control of said overload control means, said thermal actuated control means, and time delay control means and to connect said fan motor directly to the source free of control by said overload control means, said thermal actuated control means, and time delay control means.

3. The combination set forth in claim 1 wherein said compressor motor has a start connection in said first circuit means and a run connection in said first circuit means and motor starting means separate from said time delay control means to selectively connect said compressor motor in said first circuit means through said start connection or said run connection.

4. The combination set forth in claim 1 wherein said time delay control means comprises third circuit means, said second contact means includes second and third contacts operated by said energizing coil means, said contacts of said thermal relay are operatively connected in said third circuit means to connect said energizing coil means to said source through said thermostatic control means, said second contacts of said second relay means are operatively connected in said third circuit to interrupt current to said heater means, and said third contacts of said second relay means are operatively connected in said first circuit means to interrupt current in said first circuit means.

5. The combination set forth in claim 4 wherein said thermal actuated control means includes thermal actuated switch contacts, said heating means is connected across said source in a first branch circuit comprising said switch contacts and said second contacts of said second relay means, said compressor motor is connected across said source in a second branch circuit comprising said switch contacts and said third contacts of said second relay means, and said energizing coil means of said second relay is connected across said source in a third branch circuit comprising said switch contacts and said contacts of said thermal relay.

6. A control circuit for a compressor motor for a refrigeration system to selectively operate said motor from an alternating current source comprising first circuit means adapted to connect said motor across said source and including switch means interposed in a first circuit connection between said motor and said source, and control circuit means operatively connected in said first circuit means and responsive to actuation of said switch means to delay starting of said motor for a predetermined time and then automatically complete said first circuit connection to thereby allow at least partial pressure equalization in said system before said compressor motor is started, said control circuit means comprising relay means having first contact means operatively connected in said first circuit connection to complete said connection between said motor and said source, thermal relay having resistance heater means and second contact means which operate after said predetermined time in response to energization of said heater to actuate said relay means, and wherein said first contact means is also operatively connected in circuit with said resistance heater means to substantially simultaneously deenergize said heater means and complete said connection to said motor.

7. A control circuit for a compressor motor in a refrigeration system to selectively operate said motor from an alternating current source, comprising first circuit means for connection to said source and including a manually operated on-off switch and thermal actuated switch contacts for controlling current at a pair of output terminals of said first circuit means, first relay means having energizing means and at least two normally open contacts and one normally closed contact operated by said energizing means, a thermal relay having a resistance heater, a bimetal switch element and normally open contacts operated by said element, said normally closed contacts of said first relay means being connected in series with said resistance heater across said output terminals of said first circuit means, said contacts of said thermal relay means being connected in series with said energizing means across said output terminals of said first circuit means, one of said normally open contacts of said first relay means being connected in parallel with said contacts of said thermal relay, and a motor input circuit having a pair of input terminals operatively connected to a winding of said compressor motor, one of said input terminals being also connected directly to one of said output terminals of said first circuit means and the other input terminal being connected to the other output terminal of said first circuit means through said other normally open contacts of said first relay means so that said other normally open contacts of said first relay means can modify the control function of said on-off switch and said thermal actuated switch contacts.

References Cited
UNITED STATES PATENTS

| | | | |
|---|---|---|---|
| 2,069,772 | 2/1937 | Pearce | 62—158 XR |
| 3,037,364 | 6/1962 | Tucker | 62—158 |
| 3,101,432 | 8/1963 | Adams | 317—13 |
| 3,247,438 | 4/1966 | Kyle | 318—472 |

MEYER PERLIN, *Primary Examiner.*

U.S. Cl. X.R.

62—230

UNITED STATES PATENT OFFICE
CERTIFICATE OF CORRECTION

Patent No. 3,422,633                              January 21, 1969

Peter C. Bodett

It is certified that error appears in the above identified patent and that said Letters Patent are hereby corrected as shown below:

In the drawings, the wire connecting the terminal ends of relay coil CR2, in Figure 2, which short circuits the coil, should be considered as nonexistant. Column 1, line 31, "comperssor" should read -- compressor --; line 63, "pessure" should read -- pressure --. Column 2, line 29, "llustrated" should read -- illustrated --; line 45, "for" should read -- of --. Column 5, line 63, after "lay" insert -- means --. Column 6, line 16, after "source," insert -- a --.

Signed and sealed this 9th day of June 1970.

(SEAL)
Attest:

EDWARD M. FLETCHER, JR.                      WILLIAM E. SCHUYLER, JR.
Attesting Officer                               Commissioner of Patents